Nov. 23, 1943.  M. F. FULKS  2,335,112
STALK CUTTER AND CULTIVATOR
Filed Aug. 20, 1942  2 Sheets-Sheet 2
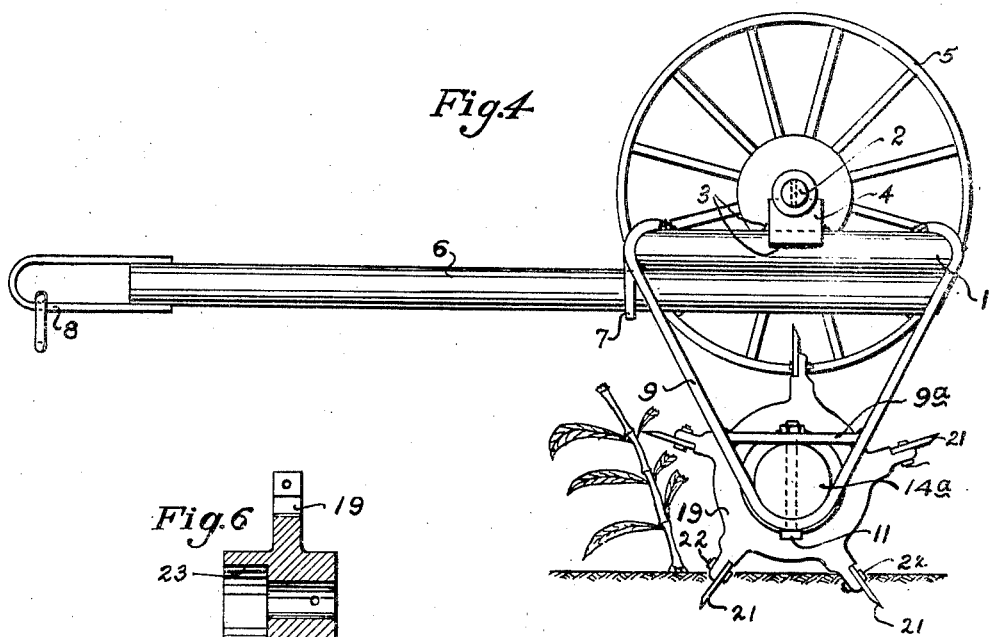
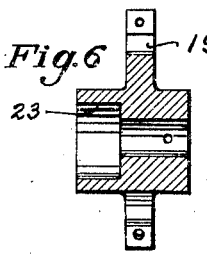
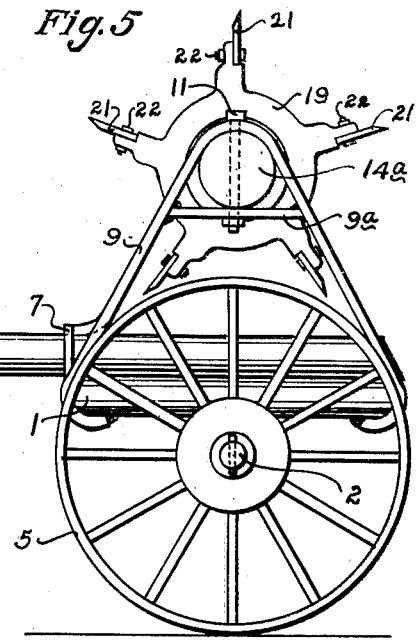
INVENTOR.
Millard F. Fulks
BY
his ATTORNEY.

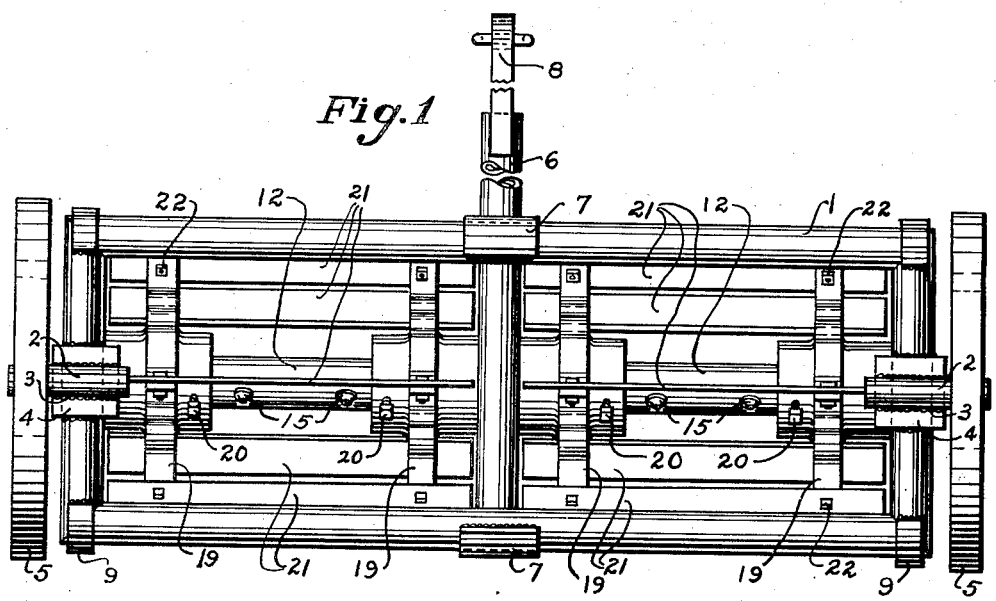
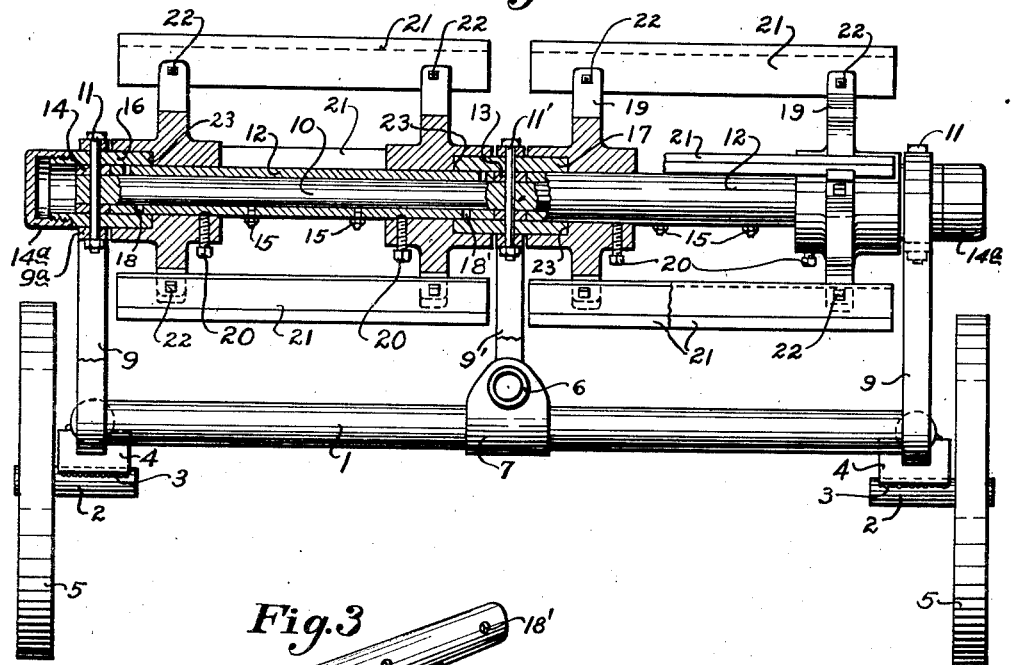
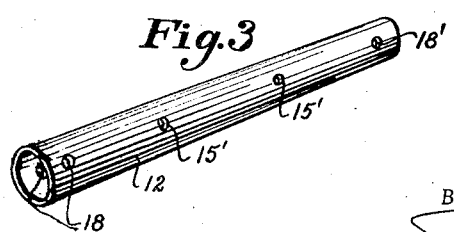

Patented Nov. 23, 1943

2,335,112

UNITED STATES PATENT OFFICE 2,335,112

STALK CUTTER AND CULTIVATOR

Millard F. Fulks, Burkburnett, Tex.

Application August 20, 1942, Serial No. 455,501

6 Claims. (Cl. 55—61)

This invention relates to improvements in stalk cutters and cultivators, particularly the character used for breaking down and chopping up corn stalks and the like, and for cultivating crops.

The object of the invention is to improve the construction of stalk cutters of this character, particularly those constructed for multiple rows, by the provision of separate and independent cutting units for the respective rows; by improving the bearing and lubricating characteristics of the respective cutting units; and by improving the mounting of the units and their capability for converting to operative and inoperative positions.

These objects are accomplished by the mounting of separate cutting units on one side of a frame while the opposite side has wheels secured thereto so that by inverting the frame, the cutting units may be moved either to operative or transporting positions, and when transported the construction provides for the draft of the machine at substantially the same point as when it is operative.

The cutting units are mounted in improved bearing assemblies which not only facilitate the operation of these units, but also have provision for the lubrication thereof, while being sealed against the entrance of foreign matter.

I have shown a preferred embodiment of the invention in the accompanying drawings, in which:

Fig. 1 is a top plan view of the cutting machine with the cutting units lowered to operative positions.

Fig. 2 is a rear elevation of the machine, with parts broken away and in section, with the cutters in raised or transporting position;

Fig. 3 is a detached perspective view of the sleeve bearing for a cutter unit;

Fig. 4 is a side elevation of the machine with the cutters in operative positions;

Fig. 5 is a similar view showing the cutters raised to transporting positions;

Fig. 6 is a cross section through one of the cutter spiders; and

Fig. 7 is a similar view of one of the end thrust bearings.

The invention illustrated in the drawings comprises a rectangular frame 1 formed of tubular members providing a rigid and secure structure, but it will be understood that any type of suitable material may be used for this frame. The frame 1 is mounted on a pair of axles 2 by means of welding 3 and blocks 4. Wheels 5 are journaled on the respective axles 2.

A tongue 6 extends transversely across the frame 1 midway between the wheels 5 and is secured to said frame by plates 7 that embrace opposite sides of the frame. The tongue 6 has an eye or loop 8 at the outer end thereof for connection with a tractor or other draft device.

Extending laterally away from the frame 1 in a direction opposite from the wheels 5 are a plurality of strap supports 9, each in the form of a loop having opposite ends secured directly to the sides of the frame, one of these supports 9 being disposed at each opposite end of the frame and a similar support 9' being disposed intermediate the ends thereof in the form of the invention shown in the drawings. The supports 9, coacting with the frame 1, provide substantial triangular supports for mounting cutter units for the machine. A cross bar 9a is disposed across the lower portion of supports 9 and 9' to form a support for the cutter bearing.

Extending between the end supports 9 at the opposite ends of the frame 1, is a shaft 10 which is mounted in the supports 9 and below cross bars 9a. Bolts 11 extend therethrough and through the opposite ends of said shaft. The shaft 10 is supported at each end between support 9 and cross bar 9a. A bolt 11' supports the intermediate portion of the shaft from the support 9'. Surrounding portions of the shaft 10 are bearing sleeves 12 journaled thereon free for turning movement relative to the shaft. The bearing sleeves 12 have their inner ends spaced apart by an interposed stationary bearing member 13, while the outer ends of said sleeves are confined by thrust bearings 14 fitted on the opposite ends of the shaft 10 and held in place by the bolts 11. Lubricant fittings 15 are provided at intervals along the length of the bearings 12 for introducing lubricant under pressure between these bearing sleeves and the shaft 10 to facilitate rotation of the sleeves relative thereto.

The outer ends of the bearing sleeves 12 are journaled in friction bearing sleeves 16 that surround the same and are held in place by the bolts 11, while the inner ends of said bearing sleeves 12 are confined in a similar bearing sleeve 17 held in place by the bolt 11'. Caps 14a are screwed to the bearing sleeves 16 to enclose the ends of the shaft 10. The opposite ends of each bearing sleeve 12 are provided with radial perforations 18 and 18' to permit lubricant to pass out of the sleeve into the respective thrust bearings 16 and 17 for lubricating the latter. These thrust bearings not only journal the sleeves for turning movement, but they serve also to seal these sleeves against the entrance of foreign matter thereto.

The cutter units are mounted on the sleeves 12 for rotation therewith, two cutter units being shown spaced lengthwise of the shaft 10 adapted for operation along respective rows. Each of these cutter units is shown as constructed in the form of a reel comprising a pair of spiders 19 secured by set screws 20 to one of the sleeves 12 adjacent opposite ends thereof and having fixed thereon cutter blades 21 that are secured to the spiders by detachable bolts 22. Each of the spiders has an internal recess 23 in the hub thereof to receive the thrust bearing 16 or 17, which thrust bearing also excludes dirt and foreign matter from within the hub of the spider.

The machine is operated along the rows in the operative position shown in Fig. 4, but it may be inverted readily to its transporting position as shown in Figs. 2 and 5. This is accomplished by turning it over onto the wheels 5 which may be done quite easily due to the substantial balance of the wheels and cutter units. The restricted area of the frame of the unit leaves no part of the machine projecting from the rear end thereof an appreciable distance beyond the wheels, which would interfere with such inverting movements of the machine.

It will be noted that the tongue 6 is spaced on the same side of the frame 1, as the cutter units, and substantially equi-distant between the planes of transportation and of operation of the machine. This will permit the same hitch on the tractor to be used for pulling the machine either in transporting or in cutting position. This location of the tongue also makes possible the draft of the machine by horses in either of these positions.

The machine may be made with any desired number of cutter units by extending the frame and the shaft to accommodate these. This machine is especially adapted for cultivating row crops which are planted in furrows, as the ground on either side of the row is leveled down to form a mulch for the crop.

The machine has its cutters spaced longitudinally of the frame in such positions that each cutter will operate along a row of corn stalks or the like. As the machine is drawn lengthwise of the rows, the cutters will rotate in contact with the ground relative to the shaft 10. As the blades 21 are thus rotated about the axis of the shaft, they will engage the stalks and press them downward until the edges of the blades sever the stalks into small particles which will approximate the length of the distance between the blades. As the cutter moves along the row, the blades will become embedded in the ground under the weight of the machine, as shown in Fig. 4, and thus will loosen the soil causing a cultivating action therein as the machine moves along. Each cutter unit being spaced lengthwise of the shaft 10 will operate on its respective row independently of the other units but in the same manner. When the machine is used solely as a cultivator, it is positioned so that the cutters operate between the rows without engagement with the hills of listed ground. Movement of the machine will then chop and mulch the soil, resulting in the loosened soil filling in around the plant stems within the row or furrow, which effects complete cultivation by the machine.

Due to the cutting action of the blades, it would be objectionable to transport the machine in its operating position along a highway or from one field to another. Therefore, transport wheels 5 have been provided and the machine may be tipped backward until it rocks over on these wheels, as shown in Fig. 5, in transport position, when it may be pulled by a tractor or other draft means to its desired place of use.

I claim:

1. A stalk cutter comprising a frame, wheels journaled on the frame, a rotatable cutter unit mounted on the opposite side of the frame from the wheels, and a tongue connected with the frame approximately midway between the respective operative and transporting positions of the machine.

2. A stalk cutter comprising a frame, wheels supporting said frame and projecting in one direction therefrom for transporting the same, a cutter unit carried by the frame and extending in the opposite direction therefrom for supporting said frame and wheels in an operative position, and a tongue extending laterally from the frame adapted for connection with a draft unit, said tongue being disposed approximately midway between said transporting and operating positions.

3. In a stalk cutter and cultivator, the combination of a supporting frame, brackets secured to said frame and extending laterally therefrom, a shaft supported at opposite ends by said brackets, a bearing sleeve journaled on said shaft, a cutter unit mounted on said sleeve for rotation therewith, means fixedly securing opposite ends of said shaft to the brackets, and thrust bearings fixed to the brackets and surrounding opposite ends of said sleeve.

4. In a stalk cutter, the combination of a supporting frame, brackets secured to said frame and extending laterally therefrom, a shaft supported at opposite ends by said brackets, a bearing sleeve journaled on said shaft, a cutter unit mounted on said sleeve for rotation therewith, means fixedly securing opposite ends of said shaft to the brackets, thrust bearings fixed to the brackets and surrounding opposite ends of said sleeve, and means for supplying lubricant into the sleeve between the same and the shaft.

5. In a stalk cutter and cultivator, the combination of a supporting frame, brackets secured to said frame and extending laterally therefrom, a shaft supported at opposite ends by said brackets, a bearing sleeve journaled on said shaft, a cutter unit mounted on said sleeve for rotation therewith, means fixedly securing opposite ends of said shaft to the brackets, thrust bearings fixed to the brackets and surrounding opposite ends of said sleeve, and means for supplying lubricant into the sleeve between the same and the shaft, said sleeve having orifices therein within the thrust bearings for directing lubricant thereto.

6. In a stalk cutter, the combination of a wheeled supporting frame, brackets secured to said frame, a shaft carried by the brackets, a bearing sleeve journaled on the shaft for rotation relative thereto, a cutter unit detachably mounted on the sleeve, end thrust bearings mounted on the shaft and confining the sleeve thereon, separate end thrust bearings surrounding portions of the shaft and holding the cutter unit in place, and means detachably securing the shaft to the respective end thrust bearings at least at one side of the cutter unit for replacement of the sleeve without removal of the cutter unit from the shaft.

MILLARD F. FULKS.